United States Patent [19]

Scheid

[11] Patent Number: 5,191,965
[45] Date of Patent: Mar. 9, 1993

[54] BUFFER STORAGE UNIT

[75] Inventor: Manfred Scheid, Ferrara, Italy

[73] Assignee: Mopa S.r.l., Italy

[21] Appl. No.: 787,391

[22] Filed: Nov. 4, 1991

[30] Foreign Application Priority Data

Nov. 5, 1990 [IT] Italy ................. 3720 A/90

[51] Int. Cl.⁵ .............................................. B65G 47/26
[52] U.S. Cl. ..................................... 198/460; 198/594
[58] Field of Search ..................... 198/460, 594, 812

[56] References Cited

U.S. PATENT DOCUMENTS

| | | | |
|---|---|---|---|
| 3,370,693 | 2/1968 | Marsden | 198/460 |
| 3,751,873 | 8/1973 | Toby | 198/812 |
| 4,469,219 | 9/1984 | Cosse | 198/594 |
| 4,881,357 | 11/1989 | Ballestrazzi et al. | 198/812 |
| 4,881,635 | 11/1989 | Raschke | 198/460 |

FOREIGN PATENT DOCUMENTS 3226588 11/1983 Fed. Rep. of Germany .
7826035 8/1986 Fed. Rep. of Germany .

Primary Examiner—Joseph E. Valenza
Attorney, Agent, or Firm—Wolf, Greenfield & Sacks

[57] ABSTRACT

Buffer storage unit for accumulating and releasing, in rows which are equidistant or have a programmed timing, products which arrive from a continuous advancement line and are arranged in non-equidistant rows, including a first conveyor belt (2) and a second conveyor belt (3) which are respectively actuated continuously and stepwise, and which have respective active portions (2a,3a) extending horizontally after one another. The belts are closed on themselves in a loop and are wound around respective sets of rollers, and the output roller (5a) of the first belt (2) and the input roller (7a) of the second belt (3) are mounted on a first slider (8) which is horizontally slidingly guided and which is associated with actuation elements which are controlled by sensors (16,17) which detect the presence of the products. The first one (16) of the sensors is arranged at the output of the active portion (2a) of the first belt (2), and the second one (17) is arranged at the output of the active portion (3a) of the second belt (3), so that upon the arrival of a product at the first sensor (17) the slider (8) is actuated in the direction opposite to the product advancement direction and so that upon the release of a product from the second belt (3) the slider (8) is actuated in the product advancement direction.

2 Claims, 2 Drawing Sheets

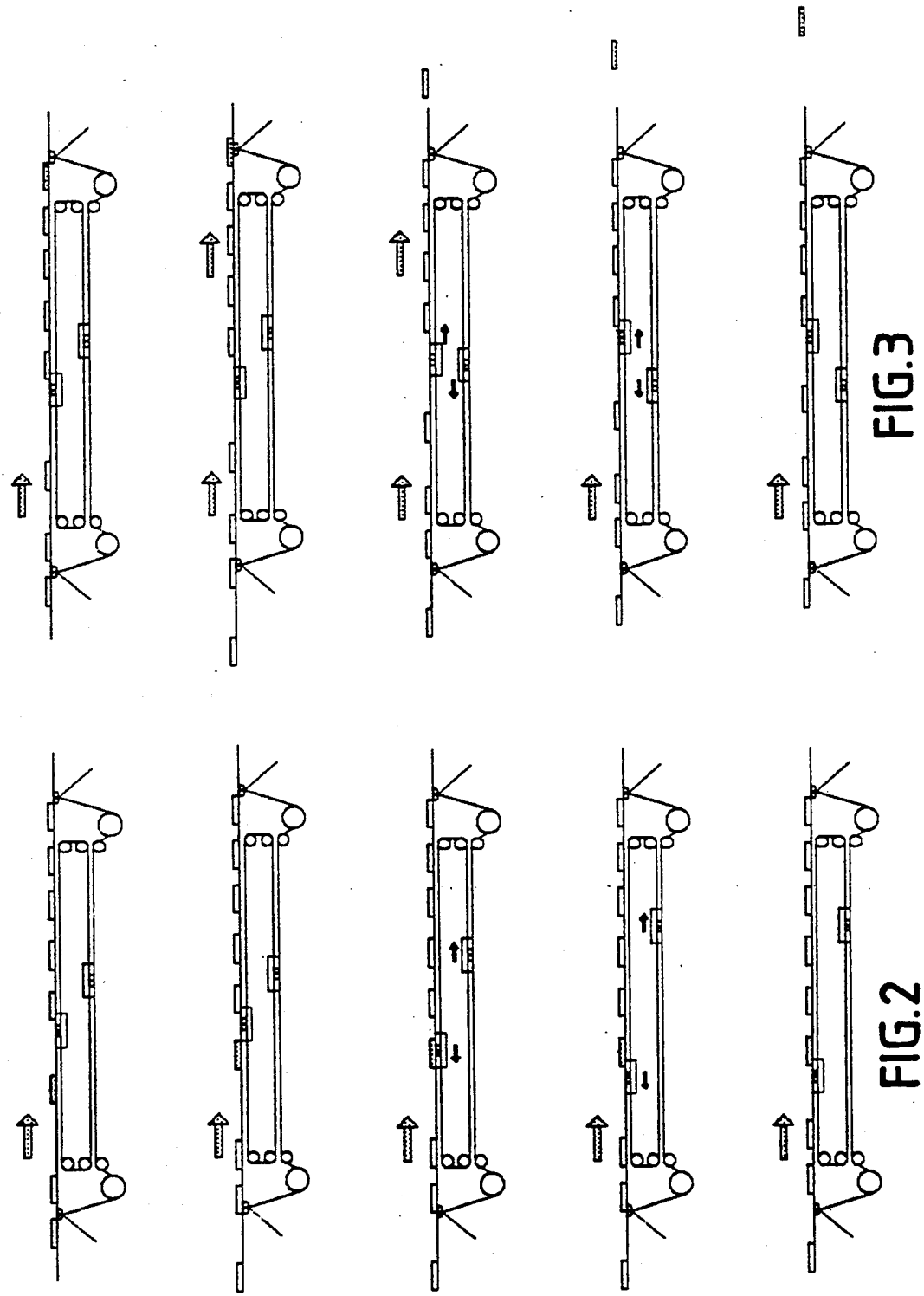

5,191,965

BUFFER STORAGE UNIT

BACKGROUND OF THE INVENTION

The present invention relates to a buffer storage unit, in particular for accumulating and releasing, in rows which are equidistant or have a programmed timing, products which arrive from a continuous advancement line and are arranged in non-equidistant rows.

Lines for packaging products such as chocolate bars, candy or the like are known, wherein the products are removed from their mold and placed on a conveyance line which extends continuously; said products are arranged in rows or groups of rows which are spaced from one another in a not strictly uniform manner (the term "rows" is used to indicate lines of products arranged perpendicular to the product advancement direction). Said rows must be transferred onto a second line which has a constant speed which is different from that of the first line; on said second line, the rows must have a strictly constant mutual distance so as to be able to effectively feed subsequent packaging machines.

There are packaging machines which are capable of changing their operating speeds according to the variations in the flow of the incoming rows, but said changes are rather difficult to perform, require a certain time to be performed and do not effectively solve the problem.

SUMMARY OF THE INVENTION

The technical aim of the present invention is to obviate the above described disadvantages, i.e. to provide a buffer storage unit which can correctly feed automatic packaging lines provided with a plurality of row distributors to which packaging machines suitable for varying their speed are connected.

Within the scope of this technical aim, an object of the present invention is to achieve said aim by means of a buffer storage unit having reduced dimensions, in that it is only slightly longer than a row accumulation region.

Another object of the present invention is to achieve the above aim with a structure which is simple, relatively easy to execute in practice, safe in use and effective in operation as well as relatively modest in cost.

This aim and these objects are all achieved by the present buffer storage unit as defined in the appended claims.

BRIEF DESCRIPTION OF THE DRAWINGS

Further peculiarities will become more apparent from the detailed description of a preferred but not exclusive embodiment of a buffer storage unit according to the present invention, illustrated only by way of non-limitative example in the accompanying drawings, wherein:

FIG. 2 is a schematic side view of the buffer storage unit during the accumulation of a row;

FIG. 3 is a schematic side view of the buffer storage unit during the release of a row.

DESCRIPTION OF THE PREFERRED EMBODIMENTS

Figure 1:
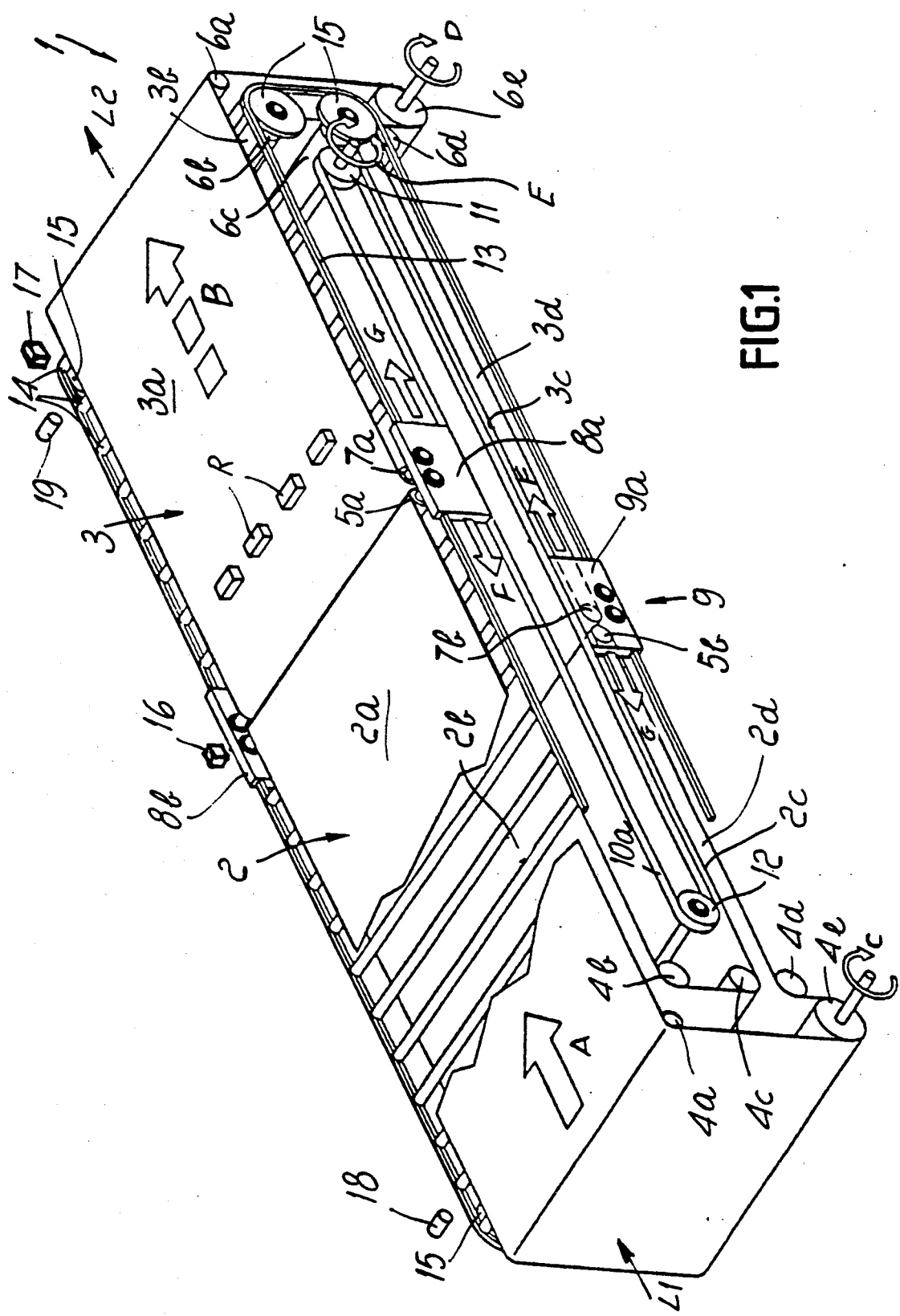
FIG. 1 is a partially cutout perspective view of a buffer storage unit for the accumulation and release of products in rows which are equidistant or have a programmed timing, according to the invention.

With particular reference to the above figures, the reference numeral 1 generally indicates the buffer storage unit for the accumulation of products which arrive from a first line L1 and which are distributed in not always equidistant rows, and for the release thereof onto a second line L2 with well-determined constant pitches or with a programmed timing.

The buffer storage unit 1 comprises a fixed supporting structure which has not been illustrated in the figures in order to avoid uselessly encumbering the drawing; reference will be made to said structure in order to progressively indicate the components which must be connected thereto.

The buffer storage unit 1 comprises a first conveyor belt 2 and a second conveyor belt 3 which are actuated, respectively, continuously in the direction A and stepwise in the direction B: the active portions 2a, 3a of the belts are horizontal and co-planar and are arranged one after the other.

The belt 2 is wound around rollers 4a, 4b, 4c, 4d, 4e which are rotatably mounted transversely to the fixed supporting structure; the roller 4e is associated with a drive unit which is suitable for making said roller turn continuously in the direction of the arrow C; the belt 2 also winds around an output roller 5a of the active portion and around an input end roller 5b.

Similarly, the belt 3 is wound around the rollers 6a, 6b, 6c, 6d, 6e, which are rotatably mounted transversely to the fixed supporting structure; the roller 6e is associated with a drive unit which is suitable for making it turn stepwise in the direction of the arrow D; the belt 3 also winds around an upper input roller 7a and an output end roller 7b.

The rollers 5a and 7a are freely mounted side by side, so as to be substantially mutually tangent, on a first slider 8 which comprises two lateral sliding blocks 8a, 8b which are horizontally slidingly guided along two sides of the fixed supporting structure.

The end rollers 5b and 7b are freely mounted side by side, so as to be substantially mutually tangent, on a second slider 9 which is in turn constituted by two sliding blocks (the first of which is indicated in FIG. 1 by the reference numeral 9a) which are also horizontally slidingly guided along two sides of the fixed supporting structure.

The pairs of sliding blocks of the sliders 8, 9 are mutually connected by a pair of first traction elements such as chains or toothed belts (one of which is indicated by the reference numeral 10a) which are wound around respective drive and transmission gearwheels 11, 12: the gearwheels can rotate in opposite directions, indicated by the double arrow E, and are suitable for moving the sliders in opposite directions, indicated by the arrows F and G, and thereby an actuation of the slider 8 in one direction is matched by an equivalent actuation of the slider 9 in the opposite direction.

The rollers 4 and 5 of the first belt and the rollers 6 and 7 of the second belt define, from the top downward, respective active conveyance portions 2a and 3a, return portions 2b and 3b, upper compensation portions 2c and 3c and lower compensation portions 2d and 3d.

The length of the sum of the portions 2a (2b) and 2c (2d) remains substantially constant even during the movements of the sliders.

The upper and lower portions of second traction elements such as two lateral chains or toothed belts 13, which are mutually connected by a plurality of transverse free rollers 14, extend respectively between the planes defined by 2a, 3a and by 2b, 3b and between the planes defined by 2c, 3c and 2d, 3d; each of the chains 13 is wound around four free gearwheels 15.

The chains are fixed to the sliders 8 and 9, and related guides are provided on the two sides of the machine; the rollers 14 are movably supported along said guides and lo support the upper active portion of the conveyor belts 2a and 3a so that it does not bend under the weight of the products.

Two product sensors 16, 17 are respectively arranged at the outputs of the active portions of the belts, i.e. the portion 2a associated with the slider 8, of the first belt, and at the output of the second belt, and are suitable for detecting the presence of the rows; said sensors control, by means of known actuation elements, the actuation of the first traction elements 10a, so that when the sensor 16 detects the arrival of a row, the slider is rapidly actuated in the direction F so that the row is transferred onto the active portion 3a.

When the belt 3a moves by one step, the slider 8 is actuated in the direction G and follows the last stored row, maintaining the transfer front directly behind the last buffered row.

In practice, when one row arrives at the end of the first belt, the second belt is rapidly moved under it with a simultaneous backward winding which avoids shocks to the product.

Shortly after the input of the belt 2, and shortly upstream of the output of the belt 3, two sensors 18, 19 for sensing the presence of the slider 8 are respectively fixed to the framework of the machine and detect the excessive filling or excessive emptying of the buffer storage unit.

It is not possible to act on the arrival rate of the products, but it is possible to act, to a certain extent, on the rate of removal of the products downstream of the machine by increasing or decreasing for a certain period of time the operating speed of a packaging machine.

In relation to this, if the sensor 18 detects excessive filling, the operating speed of a machine arranged downstream is increased, by means of known actuation means connected to said sensor 18, until the operating conditions are resumed, whereas if the sensor 19 detects excessive emptying it is necessary to stop, again by means of known actuation means, the machine arranged downstream until a certain minimum number of rows has arrived on the buffer storage unit.

At the output of the machine there is a flow of uniform rows even if the rows enter at a random rate.

The filling or emptying condition of the buffer storage unit allows to control the speed of the packaging machines.

It has thus been observed that the invention achieves the intended aim and objects.

The invention thus conceived is susceptible to numerous modifications and variations, all of which are within the scope of the inventive concept. All the details may furthermore be replaced with other technically equivalent ones.

In practice, the materials employed, as well as the shapes and dimensions, may be any according to the requirements without thereby abandoning the protective scope of the following claims.

I claim:

1. A buffer storage unit, for accumulating and releasing, in rows which are equidistant or have a programmed timing, products which arrive from a continuous advancement line and which are arranged in a non-equidistant rows, the buffer storage unit comprising:

- a first endless conveyor belt means (2) wound around a first set of rollers (4a-e, 5a-5) of which at least one roller (4e) is continuously motor drivable for driving said first endless conveyor belt means in a continuous manner; and
- a second endless conveyor belt means (3) wound around a second set of rollers (6a-e, 7a-b) of which at least one roller (6e) is stepwise motor drivable for driving said second endless conveyor belt means in an intermittent manner;

said first endless conveyor belt means comprising a first horizontally arranged active portion (2a) for supporting products thereon and said second endless conveyor belt means comprising a second horizontally arranged active portion (3a) also for supporting products thereon, said first set of rollers comprising an output roller (5a) arranged at an output end of said first active portion (2a) and said first endless conveyor belt means having a first return portion (2b) which extends from said output roller and which is arranged below said first active portion, said second set of rollers comprising an input roller (7a) arranged at an input end of said second active portion (3a) and said second endless conveyor belt means having a second return portion (3b) which extends from said second output roller and which is arranged below said second active portion, said first endless conveyor belt means further comprising first upper (2c) and lower (2d) compensation portions which are wrapped about an input end roller (5b) of said first set of rollers, said second endless conveyor belt means further comprising second upper (3c) and lower (2d) compensation portions which are wrapped about an output end roller (7b) of said second set or rollers, the buffer storage unit further comprising:

- a first sliding block means (8a,8b) which rotatably supports both said output roller (5a) and said input roller (7a) in a mutually near relationship thereby for transfer of said products from said first active portion (2a) to said second active portion (3a), said first sliding block means being reversably slidable in a direction which is parallel to an extension of said first and second active portions;
- a second sliding block means (9) which is reversably slidable and which rotatably supports both said input end roller (5b) and said output end roller (7b);
- a traction element means (10a) which is rigidly connected between said first sliding block means (8a,8b) and said second sliding block means (9);
- gearwheel means (11,12) about which is wrapped said traction element means and which are rotatably motor drivable in opposite directions for mutually sliding simultaneously both said first and second sliding block means, said gearwheel means being drivable independently of said at least one roller (6e) of said second set of rollers;
- product sensor means (16) for detecting products at said output end of said first active portion (2a) and for commanding the drive of said gearwheel means;
- a sliding block sensor means (18,19) for detecting a position of said first sliding block means and for providing a signal of excessive filling or emptying depending on said position of said first sliding block means; and
- a second product sensor means (17) for detecting products at an output end of said second active portion (3a).

2. A buffer storage unit according to claim 1, further comprising:
 a second traction element means (13) which is rigidly connected between said first sliding block means and said second sliding block means;
 freely rotating second gearwheel means (15) about which is wrapped said second traction element means; and
 a plurality of transverse free rollers (14) rotatably supported by said second traction element means and arranged below said first and second active portions for supporting thereof.

* * * * *